US011920393B2

(12) United States Patent
Wei

(10) Patent No.: US 11,920,393 B2
(45) Date of Patent: Mar. 5, 2024

(54) HIDDEN SHOWER DOOR WITH LOW-RAIL SLIDING ASSEMBLY

(71) Applicant: Ideal Sanitary Ware Co., Ltd., Guangdong (CN)

(72) Inventor: Wuxiang Wei, Guangdong (CN)

(73) Assignee: Ideal Sanitary Ware Co., Ltd. (CN)

( * ) Notice: Subject to any disclaimer, the term of this patent is extended or adjusted under 35 U.S.C. 154(b) by 357 days.

(21) Appl. No.: 17/418,602

(22) PCT Filed: Jun. 8, 2020

(86) PCT No.: PCT/CN2020/094921
§ 371 (c)(1),
(2) Date: Jun. 25, 2021

(87) PCT Pub. No.: WO2021/237803
PCT Pub. Date: Dec. 2, 2021

(65) Prior Publication Data

US 2022/0154505 A1 May 19, 2022

(30) Foreign Application Priority Data

May 26, 2020 (CN) ......................... 202010454505.0

(51) Int. Cl.
*E05D 15/06* (2006.01)
*A47K 3/34* (2006.01)
(Continued)

(52) U.S. Cl.
CPC ............ *E05D 15/0639* (2013.01); *A47K 3/34* (2013.01); *E05F 5/003* (2013.01); *E06B 3/4681* (2013.01);
(Continued)

(58) Field of Classification Search
CPC ........................ E05D 15/0639; E05D 15/0634
See application file for complete search history.

(56) References Cited

U.S. PATENT DOCUMENTS

2010/0101150 A1* 4/2010 Huang ................ E05D 15/0639 49/409
2017/0051548 A1* 2/2017 Wang ...................... E05F 5/027
(Continued)

FOREIGN PATENT DOCUMENTS

AT 511482 A3 3/2013
CA 2970515 A1 * 7/2017 ............ E05D 13/00
(Continued)

OTHER PUBLICATIONS

International Search Report for Application No. PCT/CN2020/094921 dated Feb. 19, 2021, pp. 1-4.

*Primary Examiner* — Marcus Menezes
(74) *Attorney, Agent, or Firm* — Lerner David LLP

(57) ABSTRACT

Disclosed is a hidden shower door with a low-rail sliding assembly, including an upper rail assembly (10), a movable door assembly (20), a vertical frame assembly (30), and a bottom guide part (40), wherein the upper rail assembly (10) includes an upper rail (1010), a damping trigger (1020), and sliding assemblies (1030), and the sliding assemblies (1030) each are mounted in the upper rail (1010); the sliding assemblies (1030) each include pulleys (10311), pulley brackets (1060), adjusting screws (10312), a damper (1050), and a damper bracket (1040); the pulleys (10311) are mounted on the pulley brackets (1060). The two pulley brackets (1060) are connected and fixed to two ends of the damper bracket (1040) respectively, and the damper (1050) is mounted in a damper accommodating groove (1041) of the damper bracket (1040); the upper rail (1010) is provided with a first bottom plate (1011).

9 Claims, 15 Drawing Sheets

(51) Int. Cl.
*E05F 5/00* (2017.01)
*E06B 3/46* (2006.01)

(52) U.S. Cl.
CPC ...... *E05D 15/0652* (2013.01); *E05D 15/0656* (2013.01); *E05Y 2201/21* (2013.01); *E05Y 2201/64* (2013.01); *E05Y 2201/684* (2013.01); *E05Y 2201/688* (2013.01); *E05Y 2600/12* (2013.01); *E05Y 2600/314* (2013.01); *E05Y 2600/456* (2013.01); *E05Y 2900/114* (2013.01)

(56) References Cited

U.S. PATENT DOCUMENTS

| | | | | |
|---|---|---|---|---|
| 2018/0020882 | A1* | 1/2018 | Minkovich | E05D 15/0656 4/607 |
| 2018/0070779 | A1 | 3/2018 | Minkovich et al. | |
| 2019/0309551 | A1* | 10/2019 | Hawkinson | E06B 7/2307 |
| 2022/0090429 | A1* | 3/2022 | Wei | E05D 15/063 |
| 2022/0396987 | A1* | 12/2022 | Wei | E05F 5/003 |

FOREIGN PATENT DOCUMENTS

| | | | | | |
|---|---|---|---|---|---|
| CN | 201526235 | U | | 7/2010 | |
| CN | 202960291 | U | | 6/2013 | |
| CN | 204899537 | U | | 12/2015 | |
| CN | 110159004 | A | | 8/2019 | |
| CN | 110199077 | A | | 9/2019 | |
| CN | 210422267 | U | | 4/2020 | |
| CN | 212317763 | U | | 1/2021 | |
| EP | 2617336 | A3 | | 11/2016 | |
| JP | 2009191469 | A | * | 8/2009 | E05F 1/16 |
| KR | 1661080 | B1 | * | 9/2016 | E05D 15/0621 |
| TW | 549257 | U | * | 9/2017 | E05D 13/00 |

* cited by examiner

HIDDEN SHOWER DOOR WITH LOW-RAIL SLIDING ASSEMBLY

CROSS REFERENCE TO RELATED APPLICATIONS

The present application is a national phase entry under 35 U.S.C. § 371 of International Application No. PCT/CN2020/094921, filed Jun. 8, 2020, which claims priority from Chinese Patent Application No. 202010454505.0, filed May 26, 2020, the disclosures of which are incorporated by reference herein.

TECHNICAL FIELD

The present invention relates to the technical field of sanitary ware, and in particular, to a door opening and closing structure of a shower room.

BACKGROUND

Nowadays, people usually set up shower rooms in bathrooms when decorating houses, and common shower rooms usually use shower doors with glass plates. Shower doors are generally provided with a linear partition, a rail is mounted at the partition, and one or more movable doors that can slide along the rail are hoisted below the rail. At present, the upper portion of the movable door is generally provided with a rail, and a movable glass door plate is suspended on the lower portion of the rail through pulleys. For stability and balance, the pulleys are generally arranged on both sides of the movable glass door plate. Accordingly, the rail includes two slideways, both sides of the slideways each are provided with a pulley groove, a pulley block is mounted in the pulley groove, and a suspension clamp is arranged below the pulley block and clamps the movable glass door plate. However, due to hole-cutting restrictions and rail size restrictions of the movable glass door plate, the suspension clamp below the pulley groove will be exposed from the rail, which affects the aesthetics of the product. In the prior art, if the suspension clamp needs to be hidden, the rail must be enlarged and heightened, which also affects the aesthetics of the product and wastes resources.

TECHNICAL PROBLEM

The present invention is to provide a hidden shower door with a low-rail sliding assembly against the above disadvantages in the prior art.

TECNICAL SOLUTION

To solve the above technical problems, the present invention adopts the following technical solution: A hidden shower door with a low-rail sliding assembly is provided, including an upper rail assembly, a movable door assembly, a vertical frame assembly, and a bottom guide part, wherein the bottom guide part is mounted on the lower portion of the movable door assembly, the upper rail assembly includes an upper rail, a damping trigger, and sliding assemblies, and the sliding assemblies are mounted in the upper rail; wherein the sliding assemblies each include pulleys, pulley brackets, adjusting screws, a damper, and a damper bracket; the pulleys are mounted on the pulley brackets, the two pulley brackets are connected and fixed to two ends of the damper bracket respectively, and the damper is mounted in a damper accommodating groove of the damper bracket; the upper rail is provided with a first bottom plate, and a first baffle plate and a second baffle plate which are parallel to each other extend out downward from both sides of the first bottom plate; the sliding assemblies each are entirely accommodated in a cavity enclosed by the first bottom plate, the first baffle plate, and the second baffle plate; side sliding rails horizontally and oppositely extend out from bottoms of the first baffle plate and the second baffle plate, a central partition plate parallel to the first baffle plate and the second baffle plate extends out downward from the center of the first bottom plate, and a middle sliding rail extends out from a bottom end of the central partition plate towards both sides; two slideways are separated by the first baffle plate, the second baffle plate, and the central partition plate, two sliding assemblies are provided, and each of the sliding assemblies is slidably arranged in one of the two slideways; the movable door assembly includes movable glass and an adjusting suspension clamp fixed at the top of the movable glass, a top edge of the movable glass is arranged in the slideway, the pulley on one side of the sliding assembly is in contact with the middle sliding rail, and the pulley on the other side is in contact with the side sliding rail; a third baffle plate extends out from a portion of the central partition plate between the bottom end of the central partition plate and the first bottom plate towards both sides, and the pulley is vertically located between the third baffle plate and the middle sliding rail.

In a preferred implementation solution, the pulley brackets each include a bracket body which is roughly rectangular, an adjusting screw hole for mounting the adjusting screw is formed in a central position of the bracket body along the vertical direction, two ends of the bracket body are provided with connecting bosses respectively, and the connecting bosses each are provided with a boss connecting hole; the damper bracket is an elongated bracket with a U-shaped cross section, ends of two side plates of the damper bracket each are provided with a bracket connecting hole, the connecting bosses at the ends of the bracket body extend into the damper accommodating groove of the damper bracket, and the pulley brackets and the damper bracket are connected and fixed by screws passing through the bracket connecting holes and the boss connecting holes; and the damper is mounted in the damper accommodating groove by the screws.

Further, the upper portion of the adjusting suspension clamp is provided with a suspension clamp body, the center of the suspension clamp body is provided with a screw hole, the adjusting screw hole in the bracket body of each of the pulley brackets is a countersunk through hole, and the adjusting screw passes through the adjusting screw hole and is screwed into the screw hole of the suspension clamp body to suspend the movable glass.

Further, one clamping piece extends out downward from each of two sides of the lower portion of the suspension clamp body; the clamping piece is provided with a connecting hole, a clamping groove is disposed between the two clamping pieces, and the clamping groove accommodates the top edge of the movable glass; the connecting hole in the clamping piece is aligned with a suspension clamp fixing hole in the movable glass, and the upper portion of the suspension clamp body is provided with a guiding inclined plane.

Further, the middle portion of the bracket body of each of the pulley brackets is provided with a concave portion configured to accommodate the suspension clamp body of the adjusting suspension clamp; portions on two sides of the bottom of the bracket body and near the two ends extend out downward to form four supporting plates, crossed grooves are formed by the supporting plates, a groove parallel to the longitudinal direction of the bracket body accommodates the top edge of the movable glass, and a groove perpendicular to the longitudinal direction of the bracket body accommodates the adjusting suspension clamp; the middle of each of the supporting plates is provided with a boss, and the center of the boss is provided with a pulley supporting member used for fixing the pulley.

In a preferred implementation solution, the first bottom plate of the upper rail is provided with an adjusting through hole used for making an adjustment tool contact the adjusting screw on each of the pulley brackets to implement the mounting and height adjustment of the movable door assembly; the first bottom plate is provided with a trigger mounting hole, and the damping trigger extends into the slideway of the upper rail through the trigger mounting hole to contact and be coupled to a coupling portion of the damper. As the movable glass moves, the damper is triggered to perform buffering during door closing. The first bottom plate of the upper rail is provided with the adjusting through hole, so that the adjusting screw can be screwed through the adjusting through hole, thereby facilitating the mounting and adjustment of the movable door.

Further, the damping trigger is provided with a trigger panel, two trigger stands extend out downward from the bottom surface of the trigger panel, an empty groove is formed between the two trigger stands, and a groove is formed on the outer side of the lower portion of the trigger stand; and when the trigger stands each extend into the slideway of the upper rail from the trigger mounting hole of the upper rail, the trigger panel is in contact with the first bottom plate of the upper rail.

In a preferred implementation solution, the vertical frame assembly includes a vertical frame and a vertical frame limiting member mounted at the top of the vertical frame, the vertical frame includes a vertical frame bottom plate, vertical frame side plates extend out on two sides of the vertical frame bottom plate, and the vertical frame bottom plate is provided with a vertical frame fixing hole; the vertical frame limiting member includes a limiting member body, two ends of the limiting member body are provided with baffle plates, the baffle plates are in contact with the vertical frame side plates on two sides of the vertical frame, two bosses extend out from the limiting member body toward the upper portion and the rear portion, a clamping piece extends out downward from a rear edge of each of the bosses, a clamping groove is provided between the clamping piece and the limiting member body, and an upper end face of the vertical frame is inserted into the clamping groove and is flush with an upper surface of the limiting member body; the upper end face of the vertical frame is in contact with the upper rail, and the boss on the vertical frame limiting member enters the slideway of the upper rail.

In a preferred implementation solution, the bottom guide part is fixed on a floor or a fixing base; the bottom guide part includes a bottom plate, three partition plates extend out upward from the bottom plate to form two sliding grooves which are in sliding fit with the movable glass, and the bottom plate is provided with a bottom plate fixing hole.

BENEFICIAL EFFECT

It can be learned from the above solution that, an upper rail of the hidden shower door with a low-rail sliding assembly provided in the present invention is provided with a first bottom plate, and a first baffle plate and a second baffle plate which are parallel to each other extend out downward from both sides of the first bottom plate, and sliding assemblies each are entirely accommodated in a cavity enclosed by the first bottom plate, the first baffle plate, and the second baffle plate; side sliding rails horizontally and oppositely extend out from the bottoms of the first baffle plate and the second baffle plate; a central partition plate parallel to the first baffle plate and the second baffle plate extends out downward from the center of the first bottom plate, and a middle sliding rail extends out from a bottom end of the central partition plate towards both sides; two slideways are separated by the first baffle plate, the second baffle plate, and the central partition plate, two sliding assemblies are provided, and each of the sliding assemblies is slidably arranged in one of the two slideways; and the movable door assembly includes movable glass and an adjusting suspension clamp fixed at the top of the movable glass, a top edge of the movable glass is arranged in the slideway, the pulleys on one side of the sliding assemblies are in contact with the middle sliding rail, and the pulleys on the other side are in contact with the side sliding rails; and a third baffle plate extends out from a portion of the central partition plate between the bottom end of the central partition plate and the first bottom plate towards both sides, and the pulleys are located between the third baffle plate and the middle sliding rail in the vertical direction. The above structure can raise a pulley bracket body as much as possible, and at the same time, raise the adjusting suspension clamp on the movable glass to the most extent, so that the whole adjusting suspension clamp is hidden in the slideways of the upper rail, which improves aesthetics of the product. In addition, the upper rail does not need to be enlarged or heightened, and therefore the overall weight and manufacturing cost of the upper rail are reduced while the aesthetics of the product is ensured, thereby avoiding waste of resources.

DESCRIPTION OF EMBODIMENTS

Various implementations of the present invention will be described in detail below. The embodiments are illustrated with reference to the accompanying drawings and described below, and other elements which have no impact on the protection scope of the claims of the present application are omitted from the above accompanying drawings. Although the present invention will be described with reference to example implementations, it should be understood that the present invention is not limited to these example implementations. On the contrary, the present invention includes not only these implementations, but also various modifications and improvements.

Figure 1:
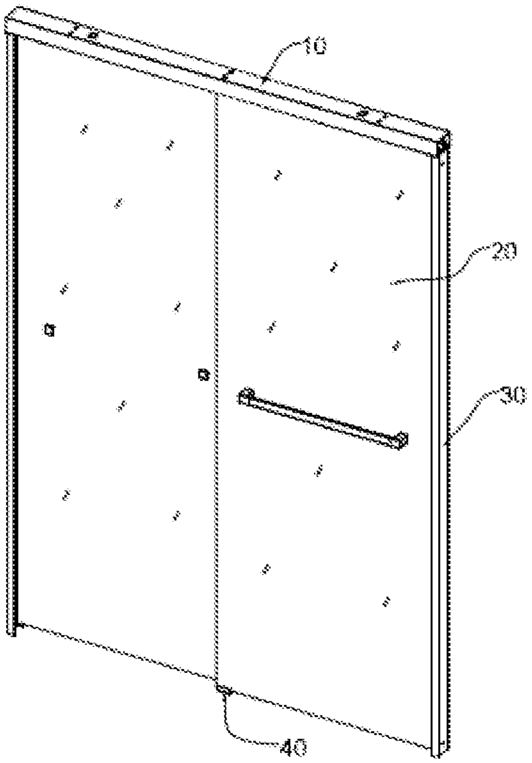
FIG. 1 is a structural diagram of a hidden shower door with a low-rail sliding assembly according to an embodiment of the present invention.
Figure 2:
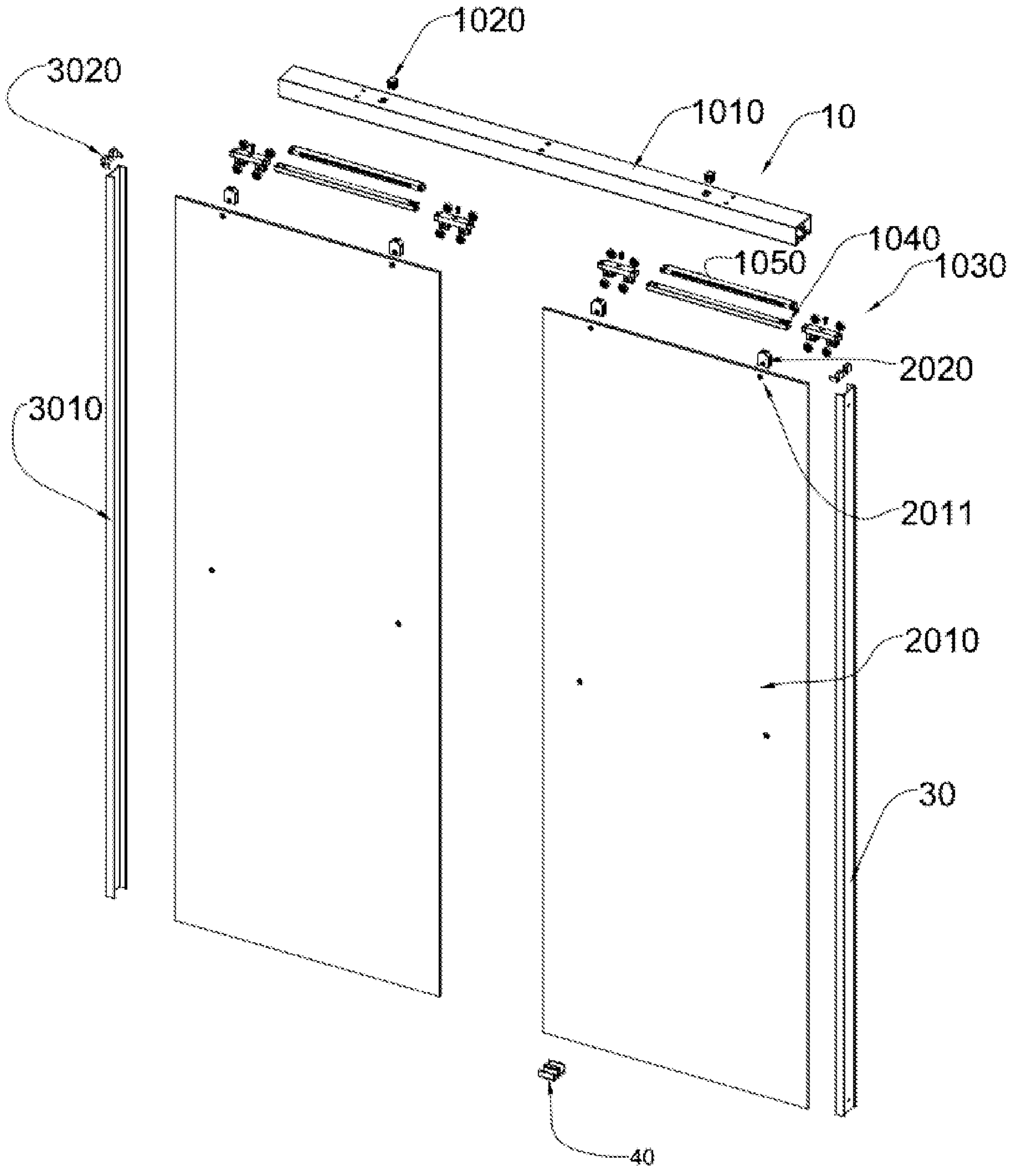
FIG. 2 is a schematic exploded view of the shower door shown in FIG. 1.

As shown in FIG. 1 and FIG. 2, an implementation of a hidden shower door with a low-rail sliding assembly of the present invention includes an upper rail assembly 10, a movable door assembly 20, a vertical frame assembly 30, and a bottom guide part 40. The upper rail assembly 10 includes an upper rail 1010, a damping trigger 1020, and sliding assemblies 1030, and the sliding assemblies 1030 are mounted in the upper rail 1010; the sliding assemblies 1030 each include pulleys 10311, pulley brackets 1060, adjusting screws 10312, a damper 1050, and a damper bracket 1040; the pulleys 10311 are mounted on the pulley brackets 1060, the two pulley brackets 1060 are connected and fixed to two ends of the damper bracket 1040 respectively, and the damper 1050 is mounted in the damper bracket 1040. The bottom guide part 40 is mounted on the lower portion of the movable door assembly 20.

Figure 3A:
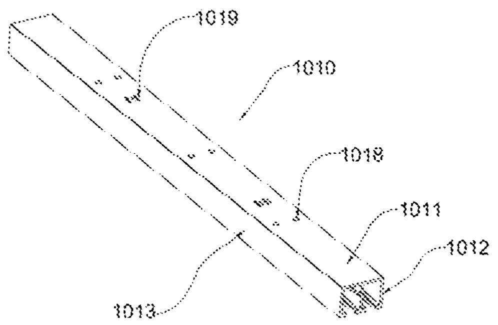
FIG. 3*a* is a 3D diagram of an upper rail of the shower door shown in FIG. 1.
Figure 3B:
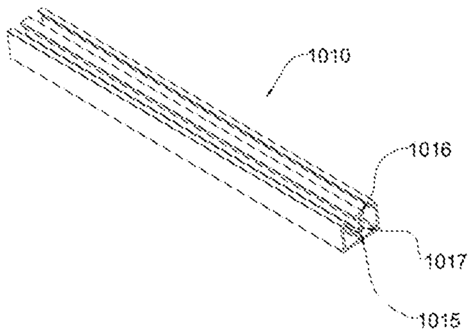
FIG. 3*b* is a 3D diagram of the upper rail shown in FIG. 3*a* from another perspective.
Figure 3C:
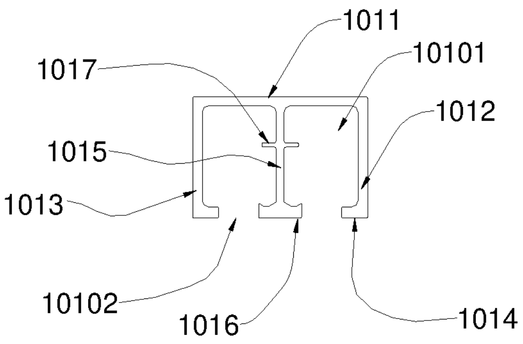
FIG. 3*c* is a longitudinal view of the upper rail shown in FIG. 3*a;*

As shown in FIG. 3*a* to FIG. 3*c*, the upper rail 1010 is provided with a first bottom plate 1011, and a first baffle plate 1012 and a second baffle plate 1013 which are parallel to each other extend out downward from both sides of the first bottom plate 1011. The sliding assemblies 1030 each are entirely accommodated in a cavity enclosed by the first bottom plate 1011 and the two baffle plates 1012 and 1013.

Side sliding rails 1014 horizontally and oppositely extend out from the bottoms of the two baffle plates 1012 and 1013, a central partition plate 1015 parallel to the baffle plates extends out downward from the center of the first bottom plate 1011, and a middle sliding rail 1016 extends out from a bottom end of the central partition plate 1015 towards both sides; two slideways 10101 and 10102 are separated by the two baffle plates 1012 and 1013 and the central partition plate 1015, two sliding assemblies 1030 are provided, and each of the sliding assemblies 1030 is slidably arranged in one of the two slideways 10101 and 10102. A top edge of the movable glass 2010 is arranged in the slideway 10102, the pulleys 10311 on one side of the sliding assemblies 1030 are in contact with the middle sliding rail 1016, and the pulleys 10311 on the other side are in contact with the side sliding rails 1014; a third baffle plate 1017 extends out from a portion of the central partition plate 1015 between the bottom end of the central partition plate 1015 and the first bottom plate 1011 towards both sides, and the pulleys 10311 are located between the third baffle plate 1017 and the middle sliding rail 1016 in the vertical direction.

Figure 4A:
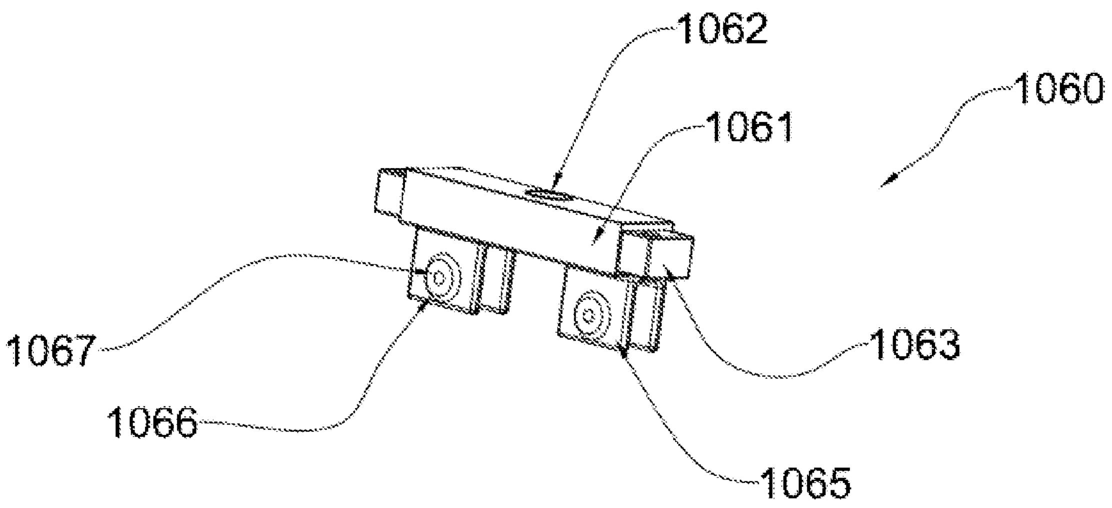
FIG. 4*a* is a 3D diagram of a pulley bracket of the shower door shown in FIG. 1.
Figure 4B:
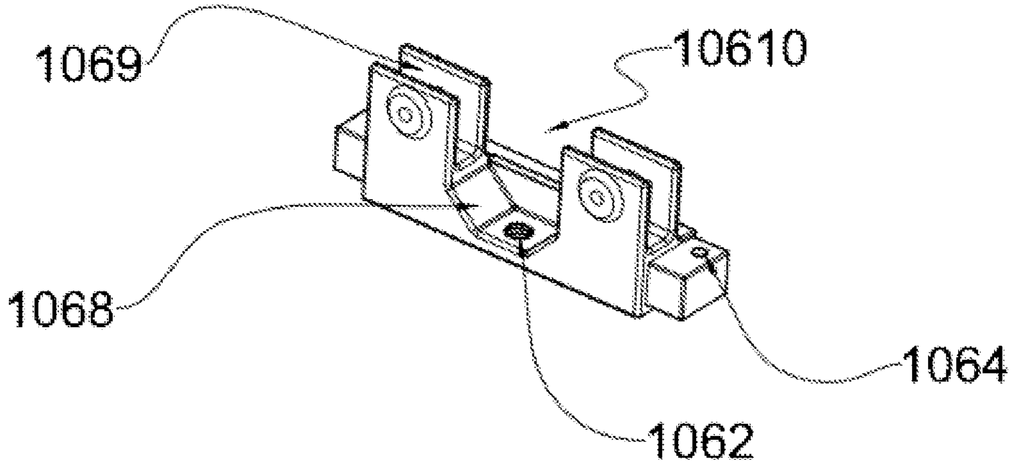
FIG. 4*b* is a 3D diagram of the pulley bracket shown in FIG. 4*a* from another perspective.
Figure 5A:
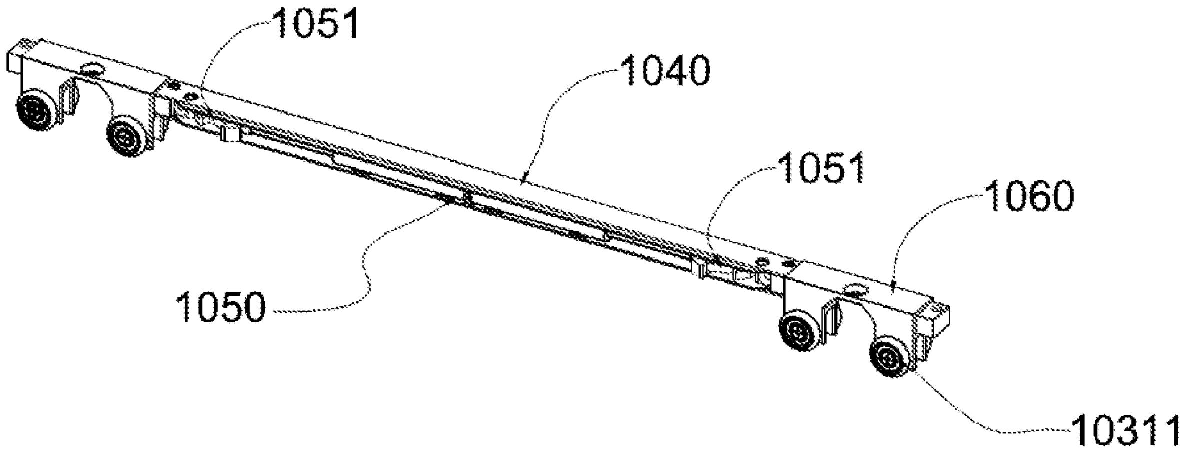
FIG. 5*a* is a schematic diagram of a connecting structure between the pulley bracket and a damper bracket of the shower door shown in FIG. 1.
Figure 5B:
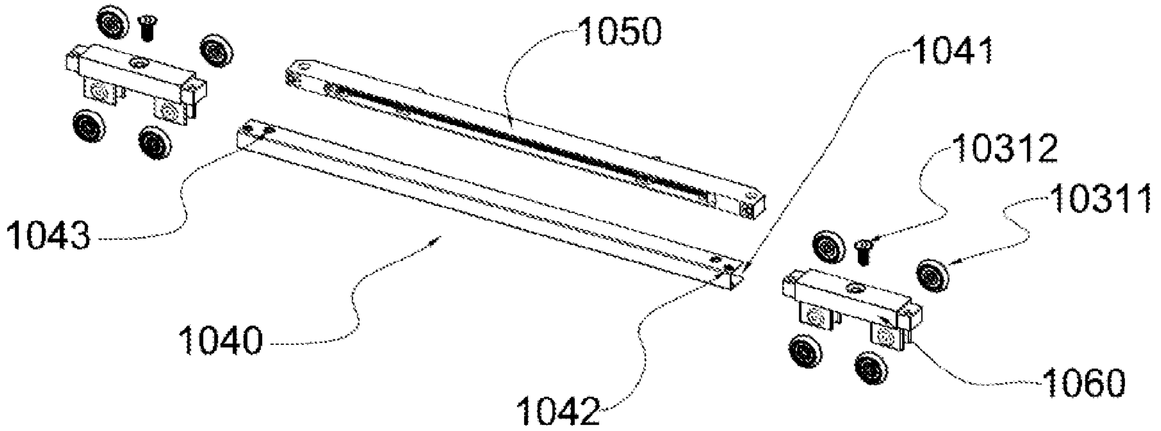
FIG. 5*b* is an exploded view of the connecting structure shown in FIG. 5*a;*

As shown in FIG. 4*a* and FIG. 4*b*, the pulley brackets 1060 each include a bracket body 1061 which is roughly rectangular, an adjusting screw hole 1062 for mounting the adjusting screw 10312 (see FIG. 5*b*) is formed in a central position of the bracket body 1061 along the vertical direction, two ends of the bracket body 1061 are provided with connecting bosses 1063 respectively, and the connecting bosses 1063 each are provided with a boss connecting hole 1064. As shown in FIG. 5*a* and FIG. 5*b*, the damper bracket 1040 is an elongated bracket with a U-shaped cross section, ends of two side plates of the damper bracket each are provided with a bracket connecting hole 1042, the connecting bosses 1063 at the ends of the bracket body 1061 extend into a damper accommodating groove 1041 of the damper bracket 1040, and the pulley brackets 1060 and the damper bracket 1040 are connected and fixed by screws passing through the bracket connecting holes 1042 and the boss connecting holes 1064. The damper 1050 is accommodated in the damper accommodating groove 1041 of the damper bracket 1040; the two side plates of the damper bracket 1040 each are provided with a damper connecting hole 1043, and the damper 1050 is fixed in the damper accommodating groove 1041 by the screws.

As shown in FIG. 4*a* and FIG. 4*b*, the middle portion of the bracket body 1061 of each of the pulley brackets 1060 is provided with a concave portion 1068 configured to accommodate a suspension clamp body 2021 of the adjusting suspension clamp 2020. Portions on two sides of the bottom of the bracket body 1061 and near the two ends extend out downward to form four supporting plates 1065, crossed grooves are formed by the supporting plates 1065, a groove 1069 parallel to the longitudinal direction of the bracket body 1061 accommodates the top edge of the movable glass 2010, and a groove 10610 perpendicular to the longitudinal direction of the bracket body 1061 accommodates the adjusting suspension clamp 2020, and the adjusting suspension clamp 2020 is accommodated in the slideway of the upper rail 1010 as much as possible. The middle of each of the supporting plates 1065 is provided with a boss 1066, and the center of the boss 1066 is provided with a pulley supporting member 1067 used for fixing the pulley 10311.

To mount the movable glass 2010 and adjust the height thereof as easily as possible, as shown in FIG. 3*a*, the first bottom plate 1011 of the upper rail 1010 is provided with four or more adjusting through holes 1018. Through the adjusting through holes 1018, a wrench can be used to contact the adjusting screws 10312 on the pulley brackets 1060 to adjust the height of the movable glass 2010. The first bottom plate 1011 of the upper rail is provided with four long trigger mounting holes 1019, and the damping trigger

1020 is mounted in the trigger mounting hole 1019. The damping trigger 1020 extends into the slideway of the upper rail 1010 through the trigger mounting hole 1019 to contact and be coupled to a coupling portion 1051 of the damper 1050. One damping trigger 1020 can control the dampers 1050 on two sliding assemblies 1030.

Figure 6A:
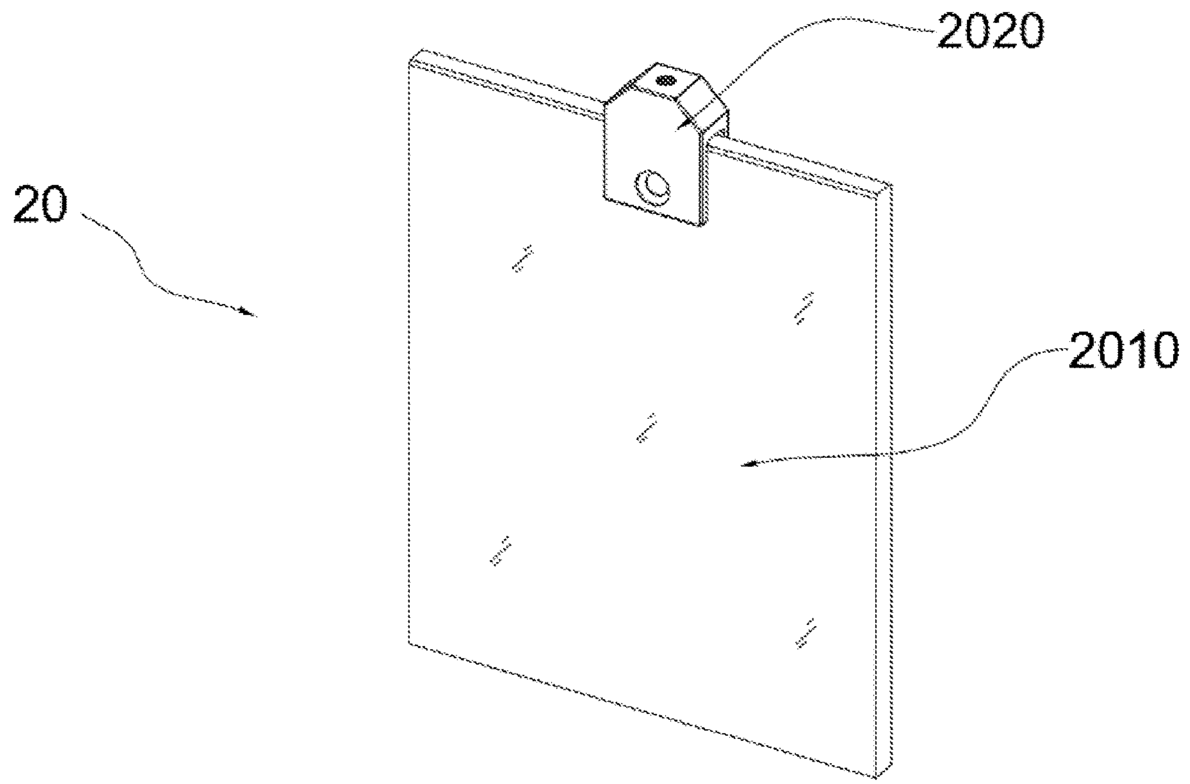
FIG. 6*a* is a schematic diagram of movable glass of the shower door shown in FIG. 1.
Figure 6B:
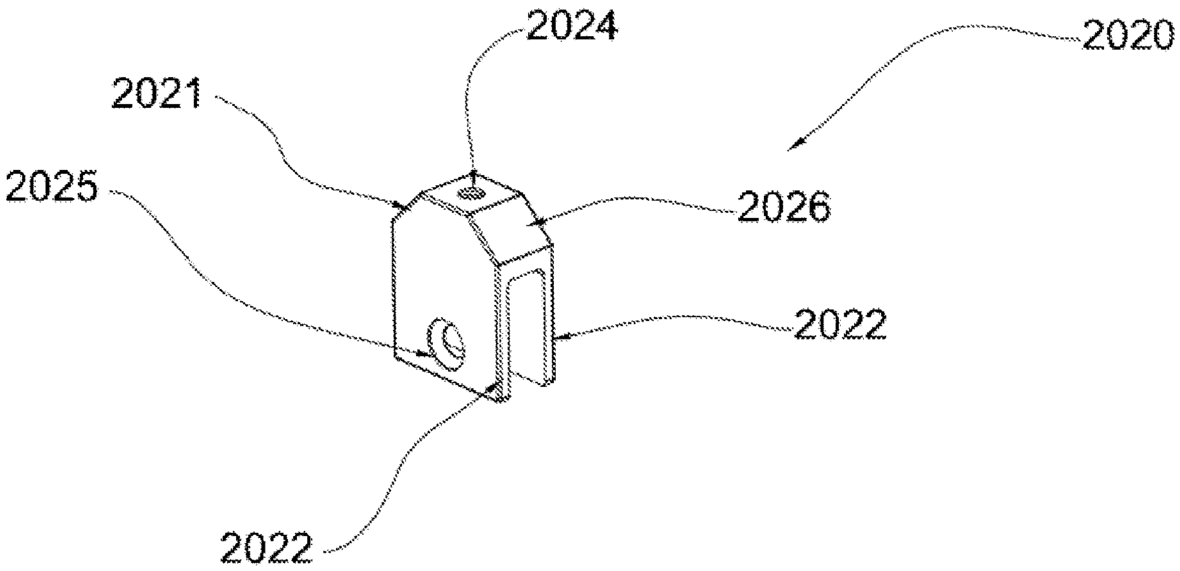
FIG. 6*b* is a 3D diagram of an adjusting suspension clamp on the movable glass shown in FIG. 6*a;*
Figure 6C:
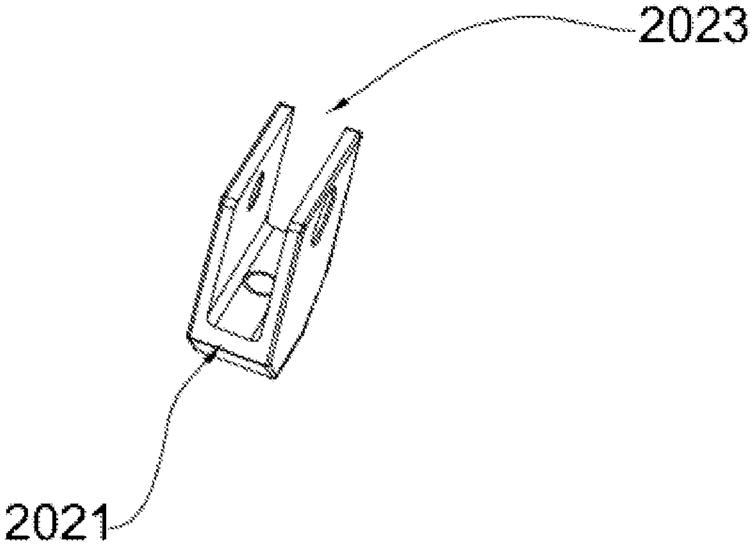
FIG. 6*c* is a 3D diagram of the adjusting suspension clamp shown in FIG. 6*b* from another perspective.
Figure 7A:
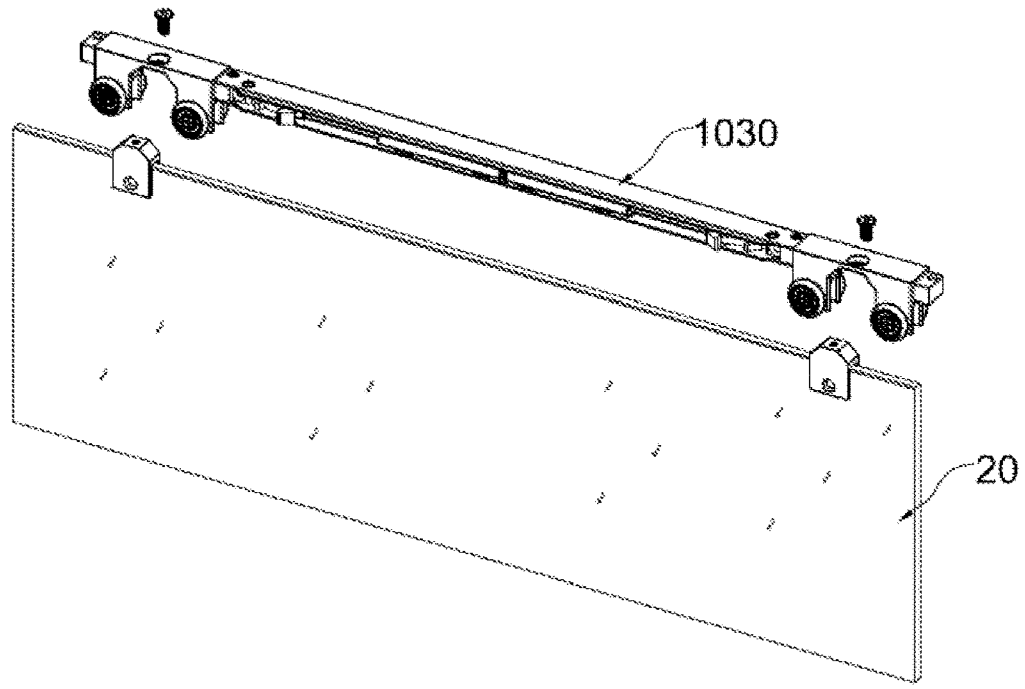
FIG. 7*a* is a schematic diagram of mounting of a sliding assembly and the movable glass of the shower door shown in FIG. 1.
Figure 7B:
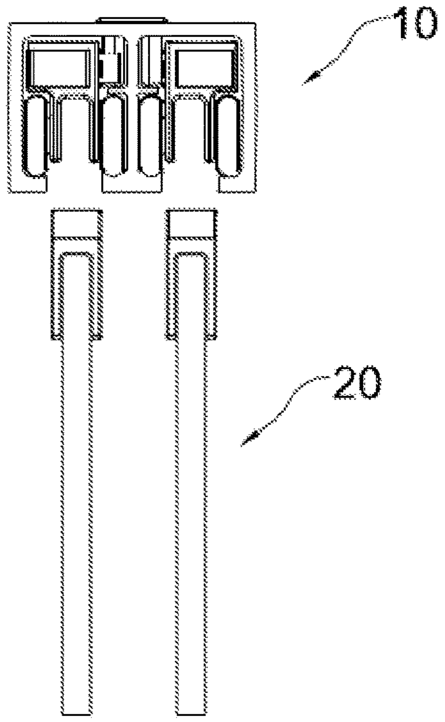
FIG. 7*b* is a longitudinal view of the upper rail, the sliding assembly, and the movable glass of the shower door shown in FIG. 1.

As shown in FIG. 6*a*, the movable door assembly 20 includes movable glass 2010 and an adjusting suspension clamp 2020 fixed at the top of the movable glass 2010, and the adjusting suspension clamp 2020 is fixed at the top of the movable glass 2010 through a suspension clamp fixing hole 2011 (see FIG. 2) at the top edge of the movable glass 2010. As shown in FIG. 6*b* and FIG. 6*c*, the upper portion of the adjusting suspension clamp 2020 is provided with the suspension clamp body 2021, the center of the suspension clamp body 2021 is provided with a screw hole 2024, the adjusting screw hole 1062 in the bracket body 1061 of each of the pulley brackets 1060 is a countersunk through hole, and the adjusting screw 10312 passes through the adjusting screw hole 1062 and is screwed into the screw hole 2024 of the adjusting suspension clamp 2020 to suspend the movable glass 2010. One clamping piece 2022 extends out downward from each of two sides of the lower portion of the suspension clamp body 2021; the clamping piece 2022 is provided with a connecting hole 2025, a clamping groove 2023 is disposed between the two clamping pieces 2022, and the clamping groove 2023 accommodates the top edge of the movable glass 2010. The connecting hole 2025 in the clamping piece 2022 is concentric with the suspension clamp fixing hole 2011 in the movable glass 2010 to facilitate connection and fixing by the screws. The upper portion of the suspension clamp body 2021 is provided with a guiding inclined plane 2026, so that the adjusting suspension clamp 2020 enters the concave portion 1068 of the pulley bracket 1060.

Figure 8A:
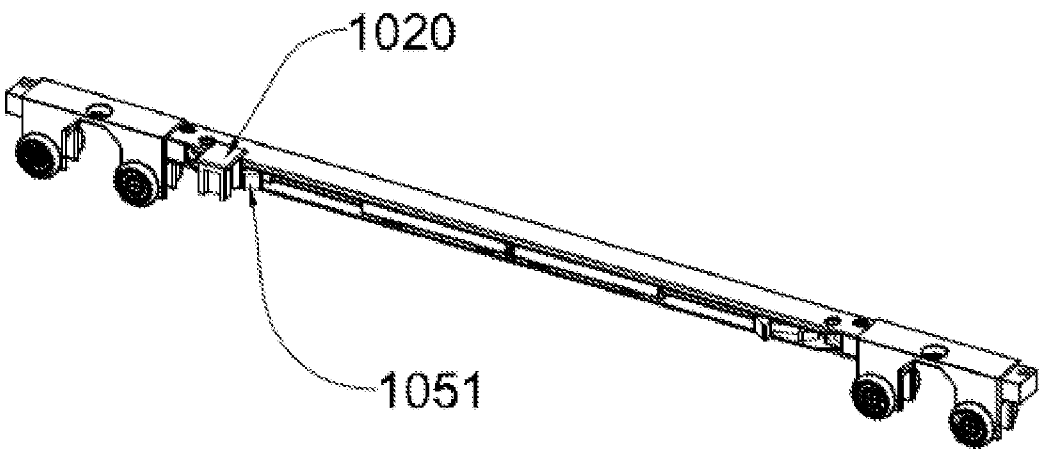
FIG. 8*a* is a schematic diagram of matching between a damping trigger and a damper of the shower door shown in FIG. 1.
Figure 8B:
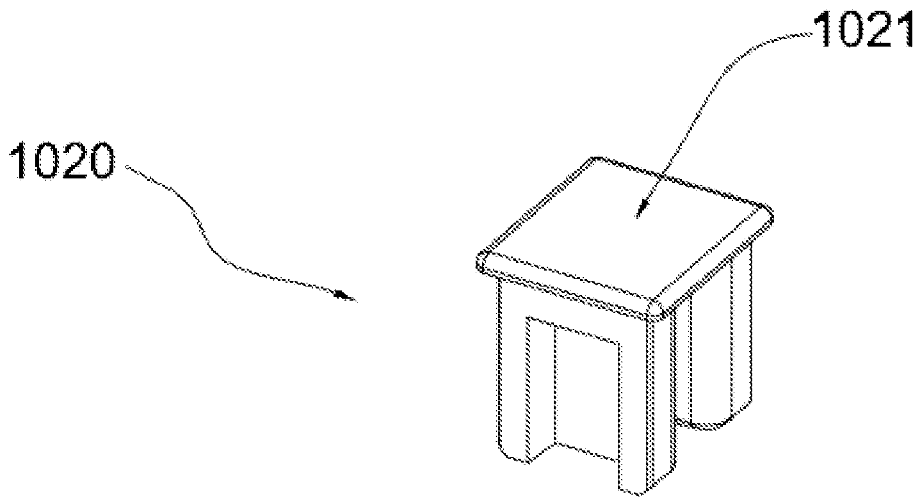
FIG. 8*b* is a 3D diagram of the damping trigger shown in FIG. 1.
Figure 8C:
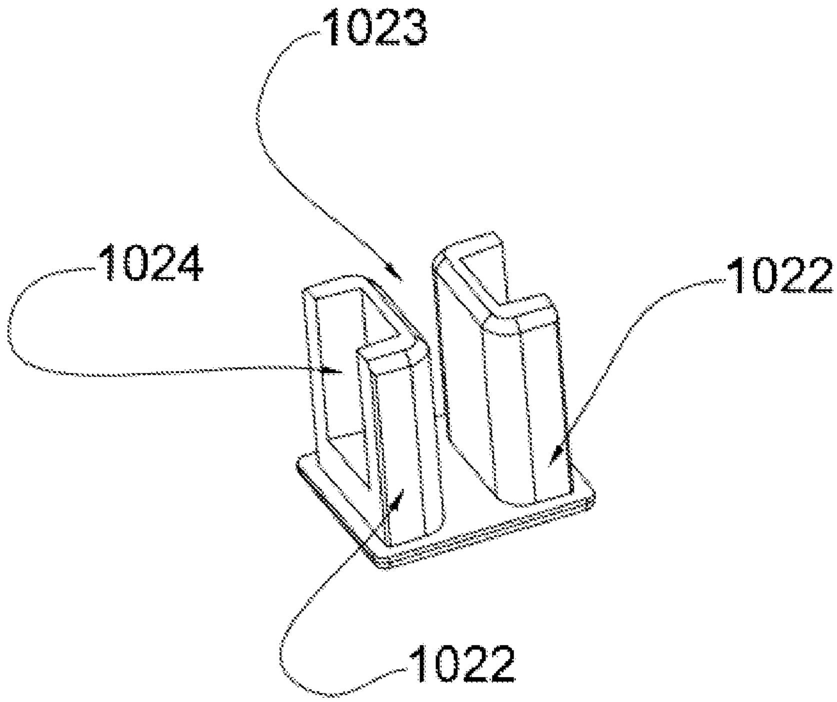
FIG. 8*c* is a 3D diagram of the damping trigger shown in FIG. 8*b* from another perspective.

As shown in FIG. 8*b* and FIG. 8*c*, the damping trigger 1020 is provided with a trigger panel 1021, two trigger stands 1022 extend out downward from the bottom surface of the trigger panel 1021, an empty groove 1023 is formed between the two trigger stands 1022, and a groove 1024 is formed on the outer side of the lower portion of the trigger stand 1022; and when the trigger stands 1022 each extend into the slideway of the upper rail 1010 from the trigger mounting hole 1019 of the upper rail 1010, the trigger panel 1021 of the damping trigger 1020 is in contact with the first bottom plate 1011 of the upper rail 1010.

Figure 9A:
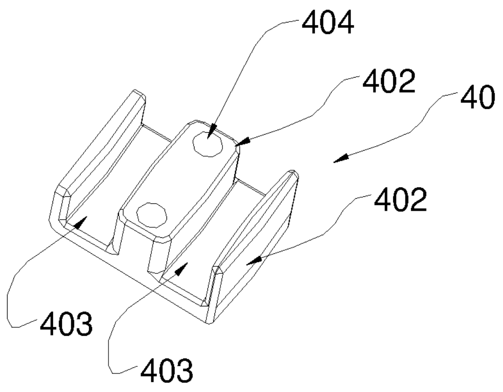
FIG. 9*a* is a 3D diagram of a bottom guide part of the shower door shown in FIG. 1.
Figure 9B:
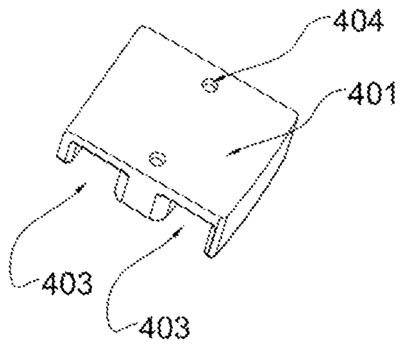
FIG. 9*b* is a 3D diagram of the bottom guide part shown in FIG. 9*a* from another perspective.

As shown in FIG. 9*a* and FIG. 9*b*, the bottom guide part 40 is fixed on a floor or a fixing base; the bottom guide part 40 includes a bottom plate 401, three partition plates 402 extend out upward from the bottom plate 401 to form two sliding grooves 403 which are in sliding fit with the movable glass 2010. The bottom plate 401 is provided with a bottom plate fixing hole 404.

Figure 10A:
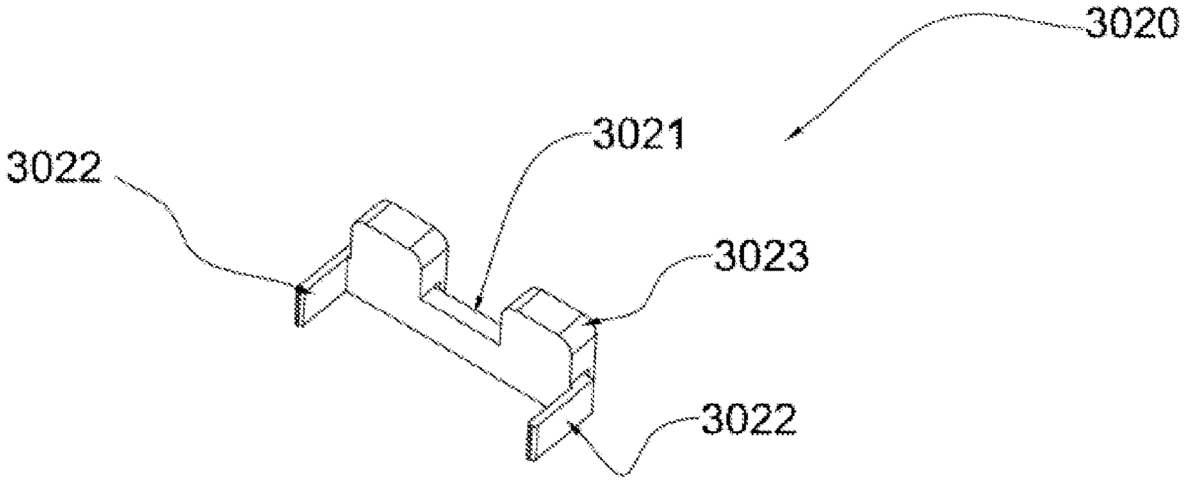
FIG. 10*a* is a 3D diagram of a vertical frame fixing member of the shower door shown in FIG. 1.
Figure 10B:
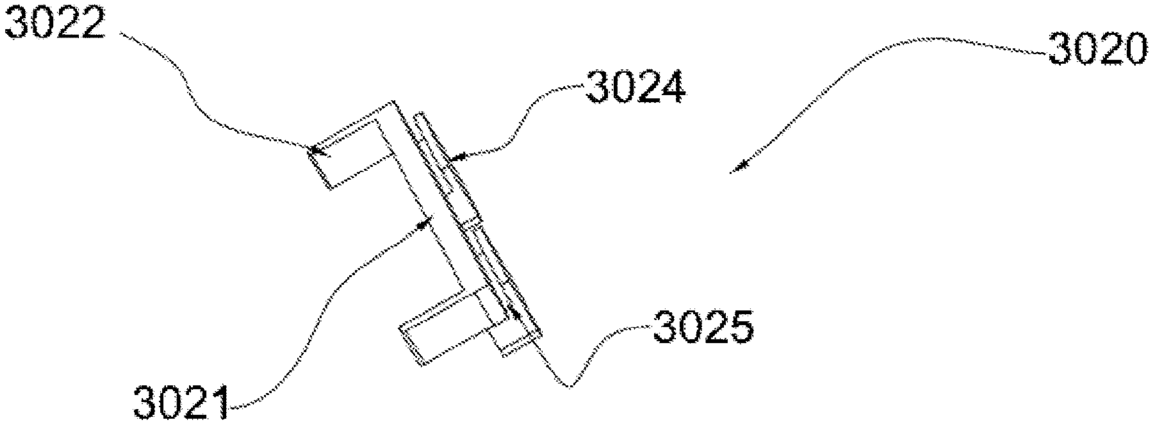
FIG. 10*b* is a 3D diagram of the vertical frame fixing member shown in FIG. 10*a* from another perspective.
Figure 10C:
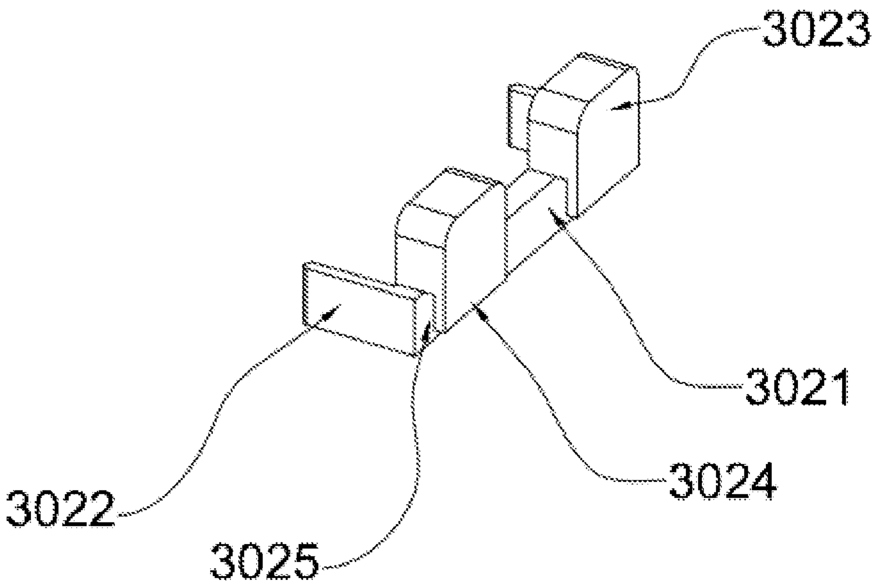
FIG. 10*c* is a 3D diagram of the vertical frame fixing member shown in FIG. 10*a* from still another perspective.
Figure 11:
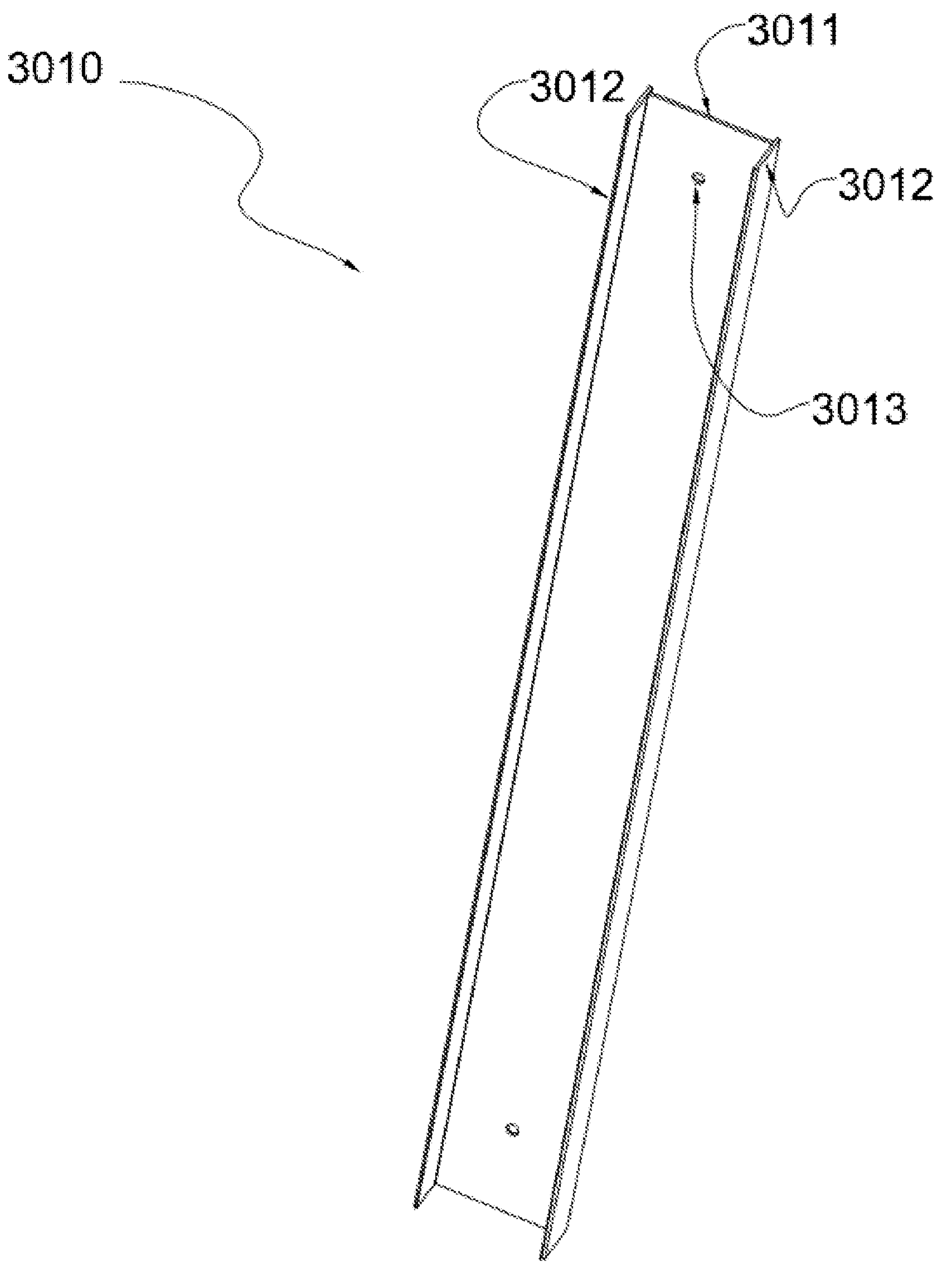
FIG. 11 is a 3D diagram of a vertical frame of the shower door shown in FIG. 1.
Figure 12:
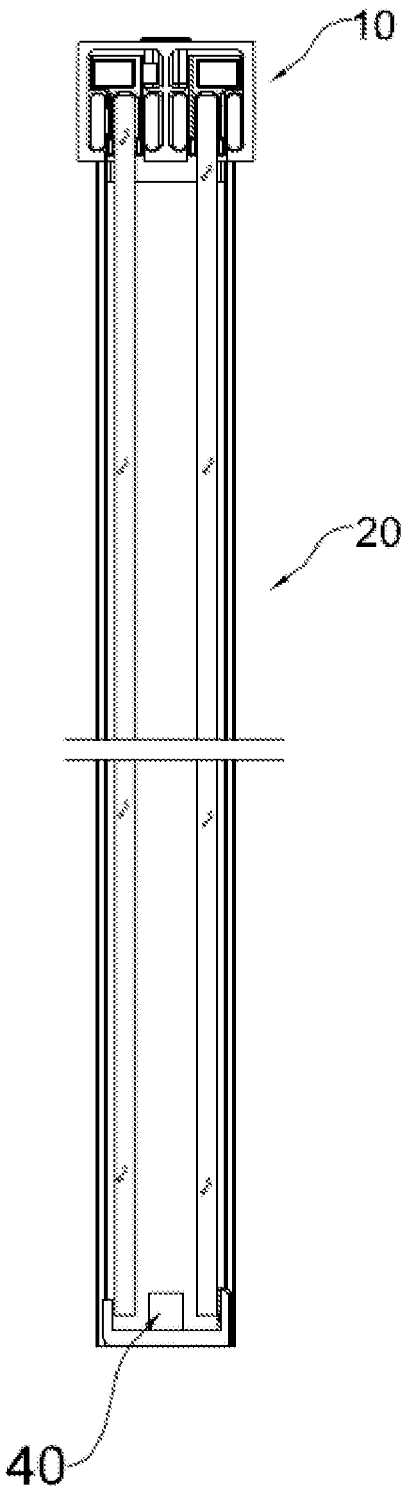
FIG. 12 is a sectional view of the shower door shown in FIG. 1.

As shown in FIG. 2, the vertical frame assembly 30 includes a vertical frame 3010 and a limiting member 3020 mounted at the top of the vertical frame 3010. As shown in FIG. 11, the vertical frame 3010 includes a vertical frame bottom plate 3011, and vertical frame side plates 3012 extend out on both sides of the vertical frame bottom plate 3011. The vertical frame bottom plate 3011 is provided with a vertical frame fixing hole 3013 to fix the vertical frame 3010 on a wall by screws. As shown in FIG. 10*a* and FIG. 10*b*, the vertical frame limiting member 3020 includes a limiting member body 3021, two ends of the limiting member body 3021 are provided with baffle plates 3022, the baffle plates 3022 are in contact with the vertical frame side plates 3012 on two sides of the vertical frame 3010, two bosses 3023 extend out from the limiting member body 3021 toward the upper portion and the rear portion, a clamping piece 3024 extends out downward from a rear edge of each of the bosses 3023, a clamping groove 3025 is provided between the clamping piece 3024 and the limiting member body 3021, and an upper end face of the vertical frame 3010 is inserted into the clamping groove 3025 and is flush with an upper surface of the limiting member body 3021. The vertical frame 3010 can bear the weight of the upper rail assembly 10 and the movable door assembly 20, and the vertical frame limiting member 3020 limits movements of the upper rail 1010 towards both sides of the vertical frame 3010 and therefore prevents separation from an end face of the vertical frame 3010. An upper end face of the vertical frame 3010 is in contact with the upper rail 1010, and the two bosses 3023 on the vertical frame limiting member 3020 enter the slideway 10102 of the upper rail 1010 to prevent the upper rail 1010 from being separated from an end of the vertical frame 3010.

Certainly, the above embodiments are only example implementations of the present invention, and in practical applications, more changes may further be made to the present invention, as long as the basic purpose of the present invention can be achieved.

INDUSTRIAL APPLICABILITY

The shower door of the present invention can be manufactured and used in the industry; therefore, the shower door is industrially practical.

What is claimed is:

1. A shower door with a low-rail sliding assembly, comprising an upper rail assembly, a movable door assembly, a vertical frame assembly, and a bottom guide part, wherein the bottom guide part is mounted on a lower portion of the movable door assembly, the upper rail assembly comprises an upper rail, a damping trigger, and sliding assemblies, and the sliding assemblies are mounted in the upper rail; the sliding assemblies each comprise rollers, roller brackets, an adjusting screw, a damper, and a damper bracket; the rollers are mounted on the roller brackets, two roller brackets are connected and fixed to two ends of the damper bracket respectively, and the damper is mounted in a damper accommodating groove of the damper bracket; the upper rail is provided with a first bottom plate, and a first baffle plate and a second baffle plate which are parallel to each other extend out downward from both sides of the first bottom plate; the sliding assemblies each are entirely accommodated in a cavity enclosed by the first bottom plate, the first baffle plate, and the second baffle plate;

side sliding rails horizontally and oppositely extend out from the bottoms of the first baffle plate and the second baffle plate, a central partition plate parallel to the first baffle plate and the second baffle plate extends out downward from the center of the first bottom plate, and a middle sliding rail extends out from a bottom end of the central partition plate towards both sides; two slideways are separated by the first baffle plate, the second baffle plate, and the central partition plate, two sliding assemblies are provided, and each of the sliding assemblies is slidably arranged in one of the two slideways; and the movable door assembly comprises movable glass and an adjusting suspension clamp fixed at the top of the movable glass, a top edge of the movable glass is arranged in one of the slideway, the rollers on one side of the sliding assemblies are in contact with the middle sliding rail, and the rollers on the other side are in contact with the side sliding rails; and a third baffle plate extends out from a portion of the central partition plate between a bottom end of the central partition plate and the first bottom plate towards both sides, and the rollers are located between the third baffle plate and the middle sliding rail in the vertical direction.

2. The shower door with a low-rail sliding assembly according to claim 1, wherein the roller brackets each comprise a bracket body which is roughly rectangular, an adjusting screw hole for mounting the adjusting screw is formed in a central position of the bracket body along the vertical direction, two ends of the bracket body are provided with connecting bosses respectively, and the connecting bosses each are provided with a boss connecting hole; the damper bracket is an elongated bracket with a U-shaped cross section, ends of two side plates of the damper bracket are each provided with a bracket connecting hole, the connecting bosses at the ends of the bracket body extend into the damper accommodating groove of the damper bracket, and the roller brackets and the damper bracket are connected and fixed by screws passing through the bracket connecting holes and the boss connecting holes; and the damper is mounted in the damper accommodating groove by the screws.

3. The shower door with a low-rail sliding assembly according to claim 2, wherein an upper portion of the adjusting suspension clamp is provided with a suspension clamp body, a center of the suspension clamp body is provided with a screw hole, the adjusting screw hole in the bracket body of each of the roller brackets is a countersunk through hole, and the adjusting screw passes through the adjusting screw hole and is screwed into the screw hole of the suspension clamp body to suspend the movable glass.

4. The shower door with a low-rail sliding assembly according to claim 3, wherein one clamping piece extends out downward from each of two sides of the lower portion of the suspension clamp body; the clamping piece is provided with a connecting hole, a clamping groove is disposed between the two clamping pieces, and the clamping groove accommodates the top edge of the movable glass; the connecting hole in the clamping piece is aligned with a suspension clamp fixing hole in the movable glass, and the upper portion of the suspension clamp body is provided with a guiding inclined plane.

5. The shower door with a low-rail sliding assembly according to claim 4, wherein the middle portion of the bracket body of each of the roller brackets is provided with a concave portion configured to accommodate the suspension clamp body of the adjusting suspension clamp; portions on two sides of the bottom of the bracket body and near the two ends extend out downward to form four supporting plates, crossed grooves are formed by the supporting plates, a groove parallel to the longitudinal direction of the bracket body accommodates the top edge of the movable glass, and a groove perpendicular to the longitudinal direction of the bracket body accommodates the adjusting suspension clamp; the middle of each of the supporting plates is provided with a boss, and the center of the boss is provided with a roller supporting member used for fixing the roller.

6. The shower door with a low-rail sliding assembly according to claim 1, wherein the first bottom plate of the upper rail is provided with an adjusting through hole used for making an adjustment tool contact the adjusting screw on each of the roller brackets to implement the mounting and height adjustment of the movable door assembly; the first bottom plate is provided with a trigger mounting hole, and the damping trigger extends into the slideway of the upper rail which the sliding assemblies are provided through the trigger mounting hole to contact and be coupled to a coupling portion of the damper.

7. The shower door with a low-rail sliding assembly according to claim 6, wherein the damping trigger is provided with a trigger panel, two trigger stands extend out downward from the bottom surface of the trigger panel, an empty groove is formed between the two trigger stands, and a groove is formed on an outer side of the lower portion of each of the trigger stands; and when the trigger stands each extend into the slideway of the upper rail which the sliding assemblies are provided from the trigger mounting hole of the upper rail, the trigger panel is in contact with the first bottom plate of the upper rail.

8. The shower door with a low-rail sliding assembly according to claim 1, wherein the vertical frame assembly comprises a vertical frame and a vertical frame limiting member mounted at the top of the vertical frame, the vertical frame comprises a vertical frame bottom plate, vertical frame side plates extend out on two sides of the vertical frame bottom plate, and the vertical frame bottom plate is provided with a vertical frame fixing hole; the vertical frame limiting member comprises a limiting member body, two ends of the limiting member body are provided with baffle plates, the baffle plates are in contact with the vertical frame side plates on two sides of the vertical frame, two bosses extend out from the limiting member body toward the upper portion and the rear portion, a clamping piece extends out downward from a rear edge of each of the bosses, a clamping groove is provided between the clamping piece and the limiting member body, and an upper end face of the vertical frame is inserted into the clamping groove and is flush with an upper surface of the limiting member body; the upper end face of the vertical frame is in contact with the upper rail, and the boss on the vertical frame limiting member enters the slideway of the upper rail which the top edge of the movable glass is arranged in.

9. The shower door with a low-rail sliding assembly according to claim 1, wherein the bottom guide part is fixed on a floor or a fixing base; the bottom guide part comprises a bottom plate, three partition plates extend out upward from the bottom plate to form two sliding grooves which are in sliding fit with the movable glass, and the bottom plate is provided with a bottom plate fixing hole.

* * * * *